(12) United States Patent
Mitchelmore et al.

(10) Patent No.: US 10,626,018 B2
(45) Date of Patent: Apr. 21, 2020

(54) METHOD OF PRODUCTION OF A COLLOIDAL SILICA CONCENTRATE

(71) Applicant: GEO40 LIMITED, Taupo (NZ)

(72) Inventors: Andrew W. Mitchelmore, Taupo (NZ); Michael T. O'Sullivan, Taupo (NZ)

(73) Assignee: GEO40 LIMITED, Taupo (NZ)

( * ) Notice: Subject to any disclaimer, the term of this patent is extended or adjusted under 35 U.S.C. 154(b) by 131 days.

(21) Appl. No.: 15/553,144

(22) PCT Filed: Feb. 25, 2016

(86) PCT No.: PCT/NZ2016/050026
§ 371 (c)(1),
(2) Date: Aug. 23, 2017

(87) PCT Pub. No.: WO2016/137340
PCT Pub. Date: Sep. 1, 2016

(65) Prior Publication Data
US 2018/0118577 A1 May 3, 2018

(30) Foreign Application Priority Data
Feb. 25, 2015 (NZ) ........................................ 705380

(51) Int. Cl.
*C01B 33/14* (2006.01)
*B01D 61/14* (2006.01)
(Continued)

(52) U.S. Cl.
CPC ............ *C01B 33/14* (2013.01); *B01D 61/025* (2013.01); *B01D 61/142* (2013.01); *B01D 61/16* (2013.01);
(Continued)

(58) Field of Classification Search
CPC ...... C01B 33/14; B01D 63/06; B01D 61/025; B01D 63/12; B01D 61/58; B01D 61/16;
(Continued)

(56) References Cited

U.S. PATENT DOCUMENTS 3,969,266 A 7/1976 Iler
4,141,825 A 2/1979 Conger
(Continued)

FOREIGN PATENT DOCUMENTS

CN 104692554 6/2015
EP 0396242 11/1990
(Continued)

OTHER PUBLICATIONS

Tomaszewska et al., "Desalination of geothermal waters using a hybrid UF-RO process. Part I: Boron removal in pilot-scale tests." Desalination vol. 319, Jun. 14, 2013, pp. 99-106. (Year: 2013).*
(Continued)

*Primary Examiner* — Anthony J Zimmer
(74) *Attorney, Agent, or Firm* — FisherBroyles, LLP—Cara Crowley-Weber

(57) ABSTRACT

The invention relates to methods of concentration of colloidal silica in geothermal fluids. More particularly, although not exclusively, the invention relates to methods and apparatus for concentrating silica by ultrafiltration to produce a substantially monodisperse colloidal silica concentrate.

18 Claims, 2 Drawing Sheets

(51) Int. Cl.
*B01D 61/16* (2006.01)
*B01D 61/58* (2006.01)
*B01D 61/02* (2006.01)
*B01D 63/06* (2006.01)
*B01D 63/12* (2006.01)

(52) U.S. Cl.
CPC ............. *B01D 61/58* (2013.01); *B01D 63/06* (2013.01); *B01D 63/12* (2013.01); *B01D 2311/04* (2013.01); *B01D 2311/106* (2013.01); *B01D 2311/12* (2013.01); *B01D 2311/2642* (2013.01); *B01D 2315/16* (2013.01); *B01D 2317/022* (2013.01); *B01D 2317/025* (2013.01)

(58) Field of Classification Search
CPC ............. B01D 61/142; B01D 2317/025; B01D 2315/16; B01D 2311/2642; B01D 2311/12; B01D 2311/106; B01D 2311/04; B01D 2317/022
See application file for complete search history.

(56) References Cited

U.S. PATENT DOCUMENTS

| | | | |
|---|---|---|---|
| 4,437,995 | A | 3/1984 | Rex |
| 5,200,165 | A | 4/1993 | Harper |
| 5,595,717 | A | 1/1997 | Harper |
| 6,372,089 | B1 | 4/2002 | Keiser et al. |
| 6,372,806 | B1 | 4/2002 | Keiser et al. |
| 6,537,457 | B1 | 3/2003 | Mukhopadhyay |
| 2004/0079700 | A1 | 4/2004 | Wood |
| 2005/0061149 | A1 | 3/2005 | Nieuwenhuizen et al. |
| 2008/0290033 | A1 | 11/2008 | Kimball |
| 2009/0008334 | A1 | 1/2009 | Schoen et al. |
| 2009/0173692 | A1 | 7/2009 | Laraway et al. |
| 2010/0032375 | A1 | 2/2010 | Jagannathan et al. |
| 2011/0016303 | A1 | 7/2011 | Kimball et al. |
| 2012/0055875 | A1 | 3/2012 | Lien |
| 2013/0126174 | A1 | 2/2013 | Henson et al. |
| 2014/0028684 | A1 | 1/2014 | Maison |
| 2015/0015874 | A1 | 6/2015 | Karlapudi |
| 2017/0182460 | A1* | 6/2017 | Mitchelmore ....... B01D 61/025 |

FOREIGN PATENT DOCUMENTS

| | | |
|---|---|---|
| JP | S57-21981 | 2/1982 |
| JP | 58190816 | 11/1983 |
| JP | 11-662 | 1/1999 |
| JP | 2005-522311 | 7/2005 |
| WO | 1997041954 A1 | 11/1997 |
| WO | WO 2002-026362 | 4/2002 |
| WO | WO 2003-084645 | 10/2006 |
| WO | 2009079047 A2 | 6/2009 |
| WO | 2015178783 A1 | 5/2015 |

OTHER PUBLICATIONS

Brown et al., "Manufacture of Silica Sols from Separated Geothermal Water," Proceedings World Geothermal Congress 2000, Kyushu—Tohoku, Japan, May 28-Jun. 10, 2000. (Year: 2000).*
Harper et al. (1992) "Towards the efficient utilization of geothermal resources," Geothermics, 21, pp. 641-651.
International Preliminary Report on Patentability (Chapter II of the PCT) PCT/NZ2016/050026, dated Jul. 4, 2017.
Brown and Bacon (2000) Proceedings World Geothermal Congress "Manufacture of Silica Sols From Separated Geothermal Water".
European Extended Search Report from EP Application No. 16755972.3 dated Sep. 18, 2018.
Extended European Search Report from EP 15795667.3 dated Nov. 7, 2017.
EP Supplementary Search Report from EP App No. 16812024 dated Jan. 29, 2019.
Guerra et al. (2012) "pH Modifications for Silica Control in Geothermal Fluids", pp. 1-9, XP055418083, Retrieved from the Internet: URL:http://www.os.is/ gogn/unu-gtp-sc/UNU-GTP-SC-14-39.pdf.
Iler (1979) "The Chimstry of Silica" John Wiley & Sons, New York 1:1-14.
International Search Report and Written Opinion from PCT/NZ2016/050099 dated Sep. 2, 2016.
International Preliminary Examination Report on Patentability from PCT/NZ2015/050064 dated Sep. 13, 2016.
Ning (2002) Desalination 151:67-73.
Sears (1956) "Determination of Specific Surface Area of Colloidal Silica by Itration with Sodium Hydroxide" Analytical Chemistry 28(12):1981-1983.
Tomaszewska et al. (2013) "Desalination of Geothermal Waters Using a Hybrid UF-RO Process Part II Membrane Scaling after Pilot-Scale Tests" Desalination 319:107-114.
Stöber et al. (1968) "Controlled Growth of Monodisperse Silica Spheres in the Micron Size Range" J. Colloid and Interface Science 26:62-69.

* cited by examiner

METHOD OF PRODUCTION OF A COLLOIDAL SILICA CONCENTRATE

This application is a National Stage Application of PCT/NZ2016/050026 filed Feb. 25, 2016, which claims benefit of NZ 705380, filed Feb. 25, 2015, both of which are incorporated herein by reference. To the extent appropriate, a claim of priority is made to each of the above disclosed applications.

FIELD OF INVENTION

The invention relates to methods of concentration of colloidal silica in high temperature geothermal fluids

BACKGROUND

Geothermally heated fluid has historically been used for direct heating but has more recently been harnessed to produce electricity. Electricity generated through geothermal power stations has been shown to be reliable, sustainable and environmentally friendly. Since geothermal power requires no fuel (except for running pumps in some power stations) it is insulated from fossil fuel cost fluctuations and dependencies. Geothermal power production also has significantly lower emissions of greenhouse gases when compared to fossil fuel electricity production methods and therefore has the potential to help mitigate global warming if widely deployed in place of fossil fuels.

One major advantage over other renewable energy sources such as wind or solar is that geothermal power does not suffer from the intermittent supply inherent in these methods. As a result, it also reduces the need for energy storage capabilities. Despite the traditional limitations of geothermal power plants requiring near-surface geothermal activity, recent advances in technology have dramatically expanded the scope of areas which can support geothermal power production.

Geothermal electricity is mainly produced via two methods. The first method produced from flash steam power plants is generally employed in areas with high temperature geothermal fluids and involves "flashing" the geothermal fluid. This involves passing the high-pressure fluid into lower-pressure tanks to achieve the separation of the fluid into steam and separated geothermal water (SGW). The resulting steam is used to drive turbines while the SGW is either re-injected into the ground or passed into a single stage binary cycle plant where further electricity is extracted from the SGW. The second method of electricity generation is through use of a two stage binary cycle power station. These plants involve the separating of steam and SGW in a flash plant with both the geothermal fluid and the steam being passed through different heat exchangers and used to vaporise a low boiling point secondary fluid (typically pentane) which in turn drives a turbine for electricity production. The cooled geothermal fluid is typically re-injected or passed into above-ground watercourses. Binary cycle power stations are able to operate with much cooler initial geothermal fluid temperatures.

Geothermal fluids contain a number of ionic species and particulate matter originating from rocks in the earth's crust. When energy is extracted from the geothermal source stream, the reduction in temperature causes a decrease in solubility of a number of dissolved species which can lead to their precipitation. This process of precipitation can be beneficial when used to extract the dissolved species. However, if too much heat is extracted, the dissolved species will precipitate out of solution leading to scaling and fouling of pipes, watercourses and other equipment. In addition, where geothermal fluids are re-injected into the ground, precipitation of species around the re-injection site can result in underground blockages and reduction in flow. Geothermal sources differ in the concentrations of dissolved species depending on geological composition. However, the precipitation problem is a major limitation preventing effective utilisation and energy recovery from geothermal sources. Enabling further energy recovery from existing geothermal sources would have major economic benefits and assist in the movement away from fossil fuel power.

A significant component of the geothermal fluid is silica (silicon dioxide). Extraction of silica is desirable to avoid the precipitation problems described above during energy recovery. One study estimates that 25% more power could be generated from exploitable geothermal resources if silica could be successfully extracted (Harper et al. 1992). In addition, precipitated silica and colloidal silica are valuable commodities in their own right with a range of industrial applications.

Prior to precipitation, silica particles form by spontaneous nucleation of the parent monomeric silicic acid species. These monomers subsequently grow by polymerization to form polymeric primary silica particles which attain a physical dimension of about 1.5 nm (Harper, 1997—U.S. Pat. No. 5,595,717A). These particles can either grow by acquiring more monomers to form a colloid, or the particles can aggregate leading to formation of a gelatinous substance known as silica gel. Silica colloids are simply large silica polymers that naturally take on a spherical shape due to surface forces. A ten nanometre colloid contains approximately 15,000 silica molecules. Depending on the conditions and presence of certain coagulants, silica particles may precipitate out of solution as a solid to form a suspension.

Despite the longstanding recognition of the problem of silica precipitation from geothermal waters, commercially viable solutions to deal with the problem by extraction of silica are yet to emerge. Known methods have focused on extraction of silica from low temperature sources (i.e. <75° C.) with low silica concentrations (i.e. <275 ppm). Extraction has been carried out on sources that have already undergone energy extraction.

Colloidal silica is most often prepared in a multi-step process from sodium silicate. The general principle is to remove sodium from sodium silicate via cation exchange. Without the sodium, polymerization takes place and particles begin to grow. An alkali-silicate solution is partially neutralized which leads to the formation of silica nuclei in the range of 1 to 5 nm. Initial acidification of a sodium silicate solution yields $Si(OH)_4$. The pH is kept slightly on the alkaline side of neutral to ensure that the subunits stay separated and colloidal silica gradually grows. The colloidal suspension is stabilized by pH adjustment and then concentrated, usually by evaporation. The maximum concentration obtainable depends on the particle size. For example, 50 nm particles can be concentrated to greater than 50 m % solids while 10 nm particles can only be concentrated to approximately 30 m % solids before the suspension becomes too unstable.

It is an object of the invention to provide a method of producing a colloidal silica concentrate from a geothermal fluid, or at least to provide the public with a useful choice.

SUMMARY OF THE INVENTION

According to a first aspect, the invention provides a method of producing a colloidal silica concentrate from a geothermal fluid containing silica, the method comprising:

a. reducing the temperature of the fluid to a temperature sufficient for colloidal nucleation to occur;
b. settling the fluid to allow colloidal silica to form;
c. passing the fluid through a first ultrafiltration unit comprising a spiral wound membrane to yield a first UF concentrate;
d. treating the first UF concentrate using one or more further ultrafiltration steps to yield a colloidal silica concentrate.

Preferably the method further comprises a step of adding a dispersant to the geothermal fluid after settling the fluid and prior to being received at the first ultrafiltration unit. Preferably the dispersant is added to the settled fluid. Preferably colloid formation substantially stops following addition of the dispersant. Preferably, the dispersant is Nalco 980 or Acumer 5000.

Preferably, the colloidal silica concentrate comprises a substantially monodisperse colloid particle size distribution. Preferably, substantially monodisperse means that the standard deviation of the particle sizes of the colloidal silica is less than 50 nm.

Preferably, the method further comprises curing the settled fluid for a period following colloid formation and prior to the fluid being received at the first ultrafiltration unit. Preferably, the curing is carried out in one or more curing tanks. Preferably, a dispersant is added to the fluid prior to ultrafiltration or prior to entering the curing tank and the period is sufficient for colloidal growth to substantially stop. Preferably the dispersant is added at a concentration of 5 ppm. Preferably, the dispersant added is between 1 and 10 ppm.

Preferably, the curing period is sufficient to substantially stop colloid formation or stabilise colloids already formed. Preferably the curing period is approximately 1.75 hours. Preferably the curing period is between 1 second and four hours. Preferably, the curing period is approximately 1 hour, approximately 2 hours, approximately 3 hours or approximately 4 hours.

Preferably, the method further comprises adjusting the pH of the geothermal fluid to between 7.0 and 9.0 prior to ultrafiltration.

Preferably the pH of the geothermal fluid is adjusted prior to settling the fluid. Preferably the pH is adjusted by the addition of at least one alkali to the geothermal fluid. Preferably the alkali is sodium hydroxide. In alternative embodiments, the alkali is selected from the group consisting of potassium hydroxide, calcium hydroxide and magnesium hydroxide.

Preferably the pH of the geothermal fluid is adjusted to a pH sufficiently high to facilitate colloidal silica production while being sufficiently low to avoid dissolution of the colloidal silica. Preferably the pH of the geothermal fluid is adjusted to a pH selected from the group consisting of between 7.0 and 8.5, between 7.5 and 9.0, between 8.0 and 9.0, greater than 7.0, greater than 7.5, greater than 8.0, greater than 8.5, approximately 7.0, approximately 7.5, approximately 8.0, approximately 8.5, approximately 9.0.

Preferably the geothermal fluid is separated geothermal water (SGW).

Preferably, the concentration of silica in the geothermal fluid is at least 300 ppm. Preferably, the concentration of silica in the geothermal fluid is selected from at least 400 ppm, at least 500 ppm, at least 600 ppm, at least 700 ppm, at least 740 ppm, at least 800 ppm, at least 1000 ppm and at least 1200 ppm.

Preferably, the geothermal fluid is reduced from a temperature of between about 90° C. and about 250° C. Preferably the temperature of the geothermal fluid is selected from the group consisting of between about 90° C. and about 150° C., between about 100° C. and about 140° C., at least 90° C., at least 100° C., at least 110° C., at least 120° C., at least 130° C., at least 140° C., less than 150° C., less than 140° C., less than 250° C., less than 200° C., less than 185° C., less than 150° C., less than 130° C., less than 120° C., approximately 90° C., approximately 100° C., approximately 110° C., approximately 120° C., approximately 130° C., approximately 140° C., approximately 150° C., approximately 185° C., approximately 200° C. or approximately 250° C.

Preferably the geothermal fluid is received from a reverse osmosis (RO) process to concentrate silica. Preferably the RO concentration process is substantially as described in New Zealand patent application no. NZ 625448.

Preferably the temperature is reduced to a temperature of between 20° C. and 80° C. Preferably the temperature of the fluid is reduced to a temperature selected from the group consisting of between 30° C. and 80° C., between 30° C. and 70° C., between 30° C. and 60° C., between 40° C. and 70° C., between 40° C. and 80° C., at least 30° C., at least 40° C., at least 50° C., at least 60° C., less than 80° C., less than 70° C., less than 60° C., less than 50° C., approximately 35° C., approximately 40° C., approximately 45° C., approximately 50° C., approximately 55° C., approximately 60° C., approximately 65° C., approximately 70° C., approximately 75° C., approximately 80° C.

Preferably the settling occurs in one or more settling tanks. Preferably, the size of the silica colloids formed is controlled by the settling time. Preferably, the settling time is between 5 minutes and 2 hours. Preferably, the settling time is approximately 30 minutes. Preferably, the settling time is selected from the group consisting of greater than 5 minutes, greater than 10 minutes, greater than 15 minutes, greater than 30 minutes, greater than 1 hour, greater than 2 hours, less than 6 hours, less than 2 hours, less than 1 hour, less than 30 minutes, less than 15 minutes, between 10 minutes and 1 hour, between 10 minutes and 45 minutes, approximately 5 minutes, approximately 10 minutes, approximately 15 minutes, approximately 20 minutes, approximately 30 minutes, approximately 45 minutes, approximately 1 hour and approximately 2 hours.

Preferably, the first ultrafiltration unit separates colloidal silica from the geothermal fluid. Preferably, the spiral wound membrane of the first UF unit has a molecular weight cutoff (MWCO) of between 1000 daltons and 7000 Daltons, preferably between 3000 and 5000 daltons. In alternative embodiments, the MWCO is greater than 1000 daltons, greater than 4000 daltons, approximately 1000 daltons, approximately 2000 daltons, approximately 4000 daltons, approximately 10000 daltons or greater than 10000 daltons.

Preferably the membrane retains particles of greater than approximately 5 nm.

Preferably, the colloidal silica retained by the first UF unit is greater than 8 nm, or has an average size of approximately 12 nm. Preferably the colloidal silica has an average size of from 5 nm to 100 nm. Preferably the standard deviation of the colloidal silica is less than 50 nm.

Preferably the flow rate through a single 8 inch spiral wound membrane is between 0.5 l/s and 2 l/s. Preferably, the flow rate through this membrane is less than 2 l/s, less than 1 l/s, approximately 0.5 l/s, approximately 1 l/s, approximately 1.5 l/s or approximately 2 l/s.

Preferably, the first UF unit comprises a feed and bleed UF design.

Preferably the geothermal fluid is pre-filtered prior to entering the ultrafiltration unit to remove at least one of particulate matter and precipitated silica. Preferably, the pre-filter comprises a 100 um screen. Preferably the screen comprises a screen size selected from the group consisting of from 10 um to 200 um, approximately 10 um, approximately 20 um, approximately 50 um, approximately 100 um, approximately 150 um, and approximately 200 um.

Preferably, the first UF unit comprises two or more stages. Preferably, each stage comprises multiple UF membranes in parallel where said stages are connected in series.

Preferably, the first UF unit produces a first UF concentrate wherein the silica concentration is selected from the group consisting of greater than 0.1 m %, greater than 0.5 m %, greater than 1 m %, greater than 1.5 m %, greater than 2 m %, greater than 5 m %, greater than 10 m %, greater than 15 m %, between 0.1 m % and 20 m %, approximately 0.5 m %, approximately 1 m %, approximately 1.5 m % and approximately 2 m %, approximately 3 m %, approximately 4 m %, approximately 5 m %, approximately 10 m %, approximately 15 m %, and approximately 20 m %.

Preferably the pH of the first UF concentrate is adjusted to a pH selected from the group consisting of between 9.0 and 11.0, between 9.0 and 10.5, between 9.0 and 10.0, between 9.5 and 11.0, between 9.5 and 10.5, greater than 9.0, greater than 9.5, greater than 10.0, less than 11.0, less than 10.5, approximately 9.0, approximately 9.5, approximately 10.0, approximately 10.5, and approximately 11.0. Preferably, the one or more further ultrafiltration steps comprises ultrafiltration using a tubular membrane or a spiral wound membrane in a second ultrafiltration unit.

Preferably, the membrane of the second UF unit retains particles of greater than approximately 200000 daltons. Preferably, the colloidal silica retained by the second UF unit is greater than 8 nm, or has an average size of approximately 12 nm.

Preferably, the second or further UF unit comprises a feed and bleed UF design.

Preferably the last UF stage is batch.

Preferably, the second or further UF unit comprises two or more stages.

Preferably, the second or further UF unit produces a UF concentrate of at least 10 m %. Preferably, the second or further UF unit produces a UF concentrate wherein the silica concentration is selected from the group consisting of greater than 2 m %, greater than 5 m %, greater than 10 m %, greater than 15 m %, greater than 20 m %, greater than 30 m %, greater than 40 m %, between 2 m % and 50 m %, approximately 10 m %, approximately 20 m %, approximately 30 m %, approximately 40 m % and approximately 50 m %.

Preferably, the first UF unit produces a first UF permeate which is passed to a reverse osmosis unit to yield an RO permeate and an RO concentrate. Preferably, the recovery rate of the RO unit is between 50% and 80%. Preferably the recovery rate is approximately 50%, approximately 60%, approximately 70% or approximately 80%.

Preferably, the RO permeate is passed to a diafiltration tank. Preferably at least a portion of the RO permeate is used to set up a diafiltration process in the second or further ultrafiltration unit. Preferably the at least a portion of the RO permeate is received in a UF feed tank which feeds the second or further ultrafiltration step.

Preferably, the first UF concentrate is combined with the RO permeate or the fluid from the diafiltration tank and passed to the second ultrafiltration unit. Preferably at least a portion of the RO permeate is combined with the first UF concentrate to diafilter the first UF concentrate and the mixture produced is passed to the second ultrafiltration unit.

Preferably the RO concentrate is recycled to the settling tanks.

Preferably the first UF concentrate is subjected to diafiltration to reduce the total dissolved salt concentration to less than approximately 1500 ppm or less than approximately 1000 ppm.

Preferably, the heat exchanger is under back pressure to prevent flashing of the geothermal fluid during cooling.

In a second aspect, the invention provides a system for concentrating silica from a geothermal fluid, the system comprising:

a. one or more heat exchangers adapted to reduce the temperature of a geothermal fluid;
b. a first ultrafiltration unit comprising a spiral wound membrane adapted to receive geothermal fluid from the heat exchanger;
c. one or more further ultrafiltration units adapted to receive a first UF concentrate from the first ultrafiltration unit.

Preferably, the heat exchanger is a plate heat exchanger, a pipe-type heat exchanger or a tube and shell heat exchanger.

Preferably, the heat exchanger is adapted to reduce the temperature of a geothermal fluid from a temperature of at least 90° C. and reduce it to between 30° C. and 80° C.

Preferably, the system comprises a dosing means adapted to dose the geothermal fluid with at least one alkali or acid to adjust the pH to a pre-determined pH.

Preferably the first dosing means is adapted to adjust the pH of the geothermal fluid to a pH selected from the group consisting of between 7.0 and 9.0, between 7.0 and 8.5, between 7.5 and 9.0, between 8.0 and 9.0, greater than 7.0, greater than 7.5, greater than 8.0, greater than 8.5, approximately 7.0, approximately 7.5, approximately 8.0, approximately 8.5, approximately 9.0.

Preferably the system further comprises one or more settling tanks adapted to allow silica colloids to form. Preferably, the system further comprises one or more curing tanks adapted to receive fluid from the settling tank and pass it to the first ultrafiltration unit, wherein the curing tank is adapted to hold the fluid for a period.

Preferably, the system further comprises one or more dosing means adapted to dose a fluid received from the settling tank.

Preferably, the system further comprises a spiral wound membrane with a molecular weight cutoff (MWCO) of between 1000 daltons and 7000 Daltons, preferably between 3000 and 5000 daltons. In alternative embodiments, the MWCO is greater than 1000 daltons, greater than 4000 daltons, approximately 1000 daltons, approximately 2000 daltons, approximately 4000 daltons, approximately 10000 daltons or greater than 10000 daltons.

Preferably, the first UF unit comprises a feed and bleed UF design.

Preferably the first UF unit further comprises a pre-filter adapted to filter the fluid entering the UF unit. Preferably, the pre-filter comprises a pre-filter with a 100 um screen. Preferably the screen comprises a screen size selected from the group consisting of from 10 um to 200 um, approximately 10 um, approximately 20 um, approximately 50 um, approximately 100 um, approximately 150 um, and approximately 200 um. Preferably, the pre-filter is connected to the system immediately prior to the first UF unit.

Preferably, the UF unit comprises two or more stages.

Preferably, the one or more further ultrafiltration units comprises a tubular membrane or a spiral wound membrane. Preferably, the membrane retains particles of greater than approximately 5 nm or greater than approximately 200000 daltons.

Preferably, the second or further UF unit comprises a feed and bleed UF design.

Preferably, the second or further UF unit comprises two or more stages.

Preferably the second dosing means is adapted to adjust the pH of the geothermal fluid to a pH selected from the group consisting of between 9.0 and 11.0, between 9.0 and 10.5, between 9.0 and 10.0, between 9.5 and 11.0, between 9.5 and 10.5, greater than 9.0, greater than 9.5, greater than 10.0, less than 11.0, less than 10.5, approximately 9.0, approximately 9.5, approximately 10.0, approximately 10.5, and approximately 11.0.

Preferably, the system further comprises a reverse osmosis unit adapted to receive a first UF permeate from the first UF unit, and to yield an RO permeate and an RO concentrate.

Preferably, the system further comprises a diafiltration tank adapted to receive the RO permeate and feed it to the second or further UF unit for diafiltration.

In a third aspect, the invention provides a colloidal silica concentrate when obtained by a method as described in the first aspect of the invention.

In a fourth aspect, the invention provides a method of controlling the dispersity of a colloidal silica concentrate prepared from a geothermal fluid containing silica, the method including:
  a. reducing the temperature of the fluid to a temperature sufficient for colloidal nucleation to occur;
  b. allowing colloids with a controlled dispersity to form by settling the fluid for a settling time at a settling temperature;
  c. filtering the fluid to yield a concentrate of from 0.1 m % to 20 m % using ultrafiltration with a spiral wound membrane.

Preferably the colloidal silica concentrate is substantially monodisperse. Preferably the colloidal silica has an average size of from 5 nm to 100 nm. Preferably the standard deviation of the colloidal silica is less than 50 nm.

Preferably, a dispersant is added after the growth period to substantially stop the colloid growth.

Preferably the settling time is as described in relation to the first aspect.

Preferably, the silica concentration in the concentrate is selected from the group consisting of greater than 0.1 m %, greater than 0.5 m %, greater than 1 m %, greater than 1.5 m %, greater than 2 m %, greater than 5 m %, greater than 10 m %, greater than 15 m %, between 0.1 m % and 20 m %, approximately 0.5 m %, approximately 1 m %, approximately 1.5 m % and approximately 2 m %, approximately 3 m %, approximately 4 m %, approximately 5 m %, approximately 10 m %, approximately 15 m %, and approximately 20 m %.

Preferably the settling temperature is sufficient for colloidal nucleation to occur. Preferably, the settling temperature is between 20° C. and 80° C. Preferably the settling temperature is selected from the group consisting of between 30° C. and 80° C., between 30° C. and 70° C., between 30° C. and 60° C., between 40° C. and 70° C., between 40° C. and 80° C., at least 30° C., at least 40° C., at least 50° C., at least 60° C., less than 80° C., less than 70° C., less than 60° C., less than 50° C., approximately 35° C., approximately 40° C., approximately 45° C., approximately 50° C., approximately 55° C., approximately 60° C., approximately 65° C., approximately 70° C., approximately 75° C., approximately 80° C.

In a fifth aspect, the invention provides a method of controlling the mean particle size of silica colloids formed from a geothermal fluid containing silica, the method including:
  a. reducing the temperature of the fluid to a temperature sufficient for colloidal nucleation to occur;
  b. allowing colloids with a controlled dispersity to form by settling the fluid for a settling time at a settling temperature.

Preferably the colloid size comprises the mean number diameter of the silica colloids. Preferably, a dispersant is added after the growth period to substantially stop the colloid growth.

Preferably the settling time is as described in relation to the first aspect.

Preferably the settling temperature is sufficient for colloidal nucleation to occur. Preferably, the settling temperature is between 20° C. and 80° C. Preferably the settling temperature is selected from the group consisting of between 30° C. and 80° C., between 30° C. and 70° C., between 30° C. and 60° C., between 40° C. and 70° C., between 40° C. and 80° C., at least 30° C., at least 40° C., at least 50° C., at least 60° C., less than 80° C., less than 70° C., less than 60° C., less than 50° C., approximately 35° C., approximately 40° C., approximately 45° C., approximately 50° C., approximately 55° C., approximately 60° C., approximately 65° C., approximately 70° C., approximately 75° C., approximately 80° C.

According to another aspect of the invention, there is provided a method of producing a silica concentrate from a geothermal fluid containing silica at greater than 300 ppm, the method comprising:
  a. adjusting the pH of the geothermal fluid to between 7.5 and 8.5;
  b. reducing the temperature of the fluid from between 100° C. and 130° C. to between 35° C. and 75° C.;
  c. settling the fluid to allow colloidal silica to form;
  d. adding a dispersant to the fluid;
  e. filtering the fluid to remove precipitated silica;
  f. passing the fluid through a first ultrafiltration unit comprising a spiral wound membrane to yield a first UF concentrate;
  g. adjusting the pH of the first UF concentrate to between 9.0 and 11.0;
  h. passing the first UF concentrate to a second ultrafiltration unit to yield a colloidal silica concentrate.

Further aspects of the invention, which should be considered in all its novel aspects, will become apparent to those skilled in the art upon reading of the following description which provides at least one example of a practical application of the invention.

The embodiments referred to herein are intended to be read in conjunction with any of the aspects or other embodiments.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

Figure 1:
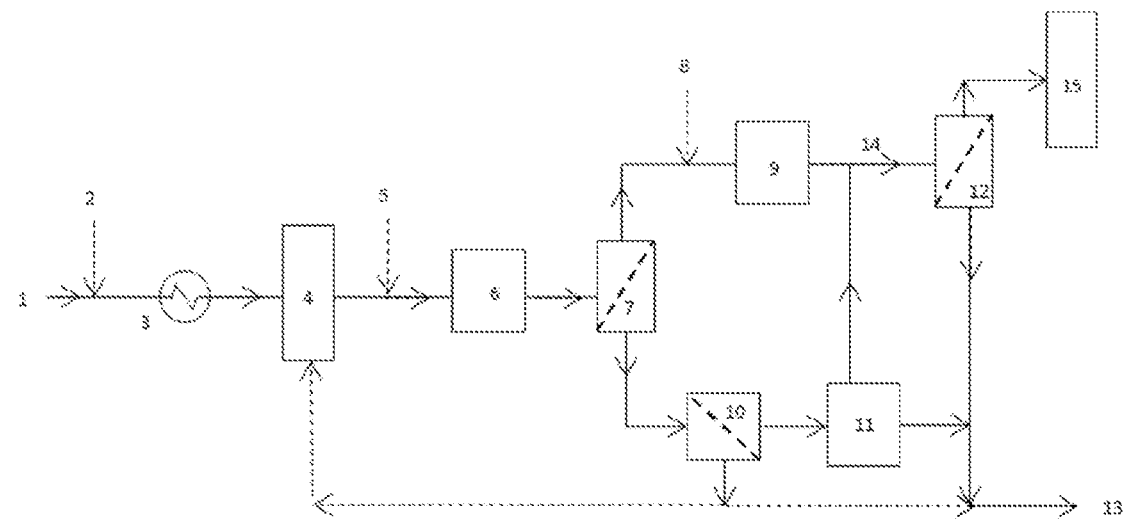
FIG. 1 shows an embodiment of the invention for the concentration of colloidal silica.

"Geothermal fluid" refers to any liquid fraction of a fluid stream principally obtained from the ground and heated by geothermal energy. The geothermal fluid may be separated geothermal water (SGW) which is produced following flashing of a high temperature pressurised geothermal stream to separate steam.

A "colloid" refers to a non-crystalline substance consisting of large molecules or ultramicroscopic particles of one substance dispersed in a continuous phase through a second substance. Colloids are typically too large to pass through a semi-permeable membrane.

"Colloidal silica" or "silica colloids" refers to a dispersed suspension of silicon dioxide (silica) particles in a liquid phase. Typically colloidal silica comprises large silica polymers that naturally take on a spherical shape due to surface forces.

"Dispersity" is the IUPAC-approved measure of the distribution of molecular mass in a given polymer/colloid sample. The dispersity indicates the distribution of individual molecular masses in a batch of polymers/colloids.

"Size of silica colloids" and like terminology is intended to refer to the mean number diameter. This average is weighted towards the number distribution.

"Precipitated silica" or a "silica precipitate" refers to solid silica which has precipitated out of a solution. This precipitated silica may be present as a suspension. Precipitated silica can be recognised as being different to colloidal silica because precipitated silica will eventually settle whereas colloidal silica will be retained in a dispersed phase.

"Silica concentration" and the like refer to the total silica concentration in a liquid phase. Total silica (i.e. monomeric silica plus colloidal silica) may be measured by any known method such as an ionic coupled plasma (ICP) test, or the specific gravity of the concentrate relative to a reference. Specific gravity is measured according to known methods using a hydrometer. Unless stated otherwise, the measurements described herein are in units of m % was measured using a hydrometer by calculation of the specific gravity of a sample. Total silica is expressed in terms of parts per million (ppm) or mass percentage (m %).

"Metal" or "metal component" as referred to herein is not limited to a pure elemental form of the metal and is intended to encompass ionic forms of metals. These may be in solution, in suspension, or in any other state. These terms are also intended to encompass metalloid elements.

"Concentrate" refers to the fraction of fluid exiting a reverse osmosis/ultrafiltration unit that has not passed through the semi-permeable membrane of the unit. A silica concentrate is a concentrate comprising at least silica.

"Permeate" refers to the fraction of fluid exiting a reverse osmosis/ultrafiltration unit that has passed through the semi-permeable membrane of the unit.

"Recovery rate" or "recovery" when referring to a reverse osmosis/ultrafiltration process means the percentage amount of feed that passes through the membrane as permeate.

"Ultrafiltration" or "UF" refers to a filtration method that uses a semi-permeable membrane to separate a feed fluid to yield a concentrate and a permeate. Ultrafiltration is used to filter matter from a feed fluid in a range from 0.005-0.01 µm (>1000 Dalton).

An "ultrafiltration unit" as referred to herein comprises an ultrafiltration housing containing one or more semi-permeable membranes. The unit may be any suitable unit and such units will be known to those of skill in the art. By way of example, the housing of the unit may comprise a Pentair Codeline model 80860. The membrane received within the housing may comprise any suitable membrane. In a particular embodiment, the membrane comprises a 4 inch spiral wound membrane. In alternative embodiments, the membrane may comprise an 8 inch spiral wound membrane or another size of spiral wound membrane. Those of skill in the art will appreciate membranes and housings appropriate for the process. However, by way of example, the membrane may be sourced from Membrane Development Specialists, San Diego, USA.

A "system comprising the ultrafiltration unit" or similar wording comprises pipework and other features that would be typically employed to enable the transport and flow of geothermal fluids from a feed to the ultrafiltration unit. By way of example, the "system" may include pressure release valves, heat exchangers, filters, instrumentation (pressure sensors, flow sensors, pH sensors), mixing tees (static mixers).

A "reverse osmosis unit" as referred to herein comprises a reverse osmosis vessel which includes one or more semi-permeable membranes. The unit may be any suitable reverse osmosis unit. Such units will be known to those of skill in the art. However, by way of example, the unit may comprise hand wound reverse osmosis membranes using Filmtech 8040F membranes and high temperature ADT and permeate tubes or GE Industrial RO elements. Reverse osmosis membranes referred to herein and used by the present inventors were sourced from Membrane Development Specialists, San Diego, USA.

"Diafiltration" comprises the addition of a solvent with a lower concentration of ions or impurities to a feed of higher concentration to dilute the components of the feed. Diafiltration may be carried out according to known methods.

"Sodium hydroxide" may also be referred to as "caustic" herein. The concentration of sodium hydroxide to achieve a particular pH will depend on a number of factors and will be able to be readily ascertained by one of skill in the art.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the scope of the invention.

In general terms, the invention described in New Zealand patent application no. NZ 625448 provided a method of producing a silica concentrate from a geothermal fluid having a silica concentration of at least 300 ppm using reverse osmosis (RO) technology. That method comprised the steps of reducing the pH of the geothermal fluid prior to passing the geothermal fluid to a reverse osmosis unit, and passing that geothermal fluid at a temperature of at least 80° C. through a system comprising the reverse osmosis unit to produce a silica concentrate and a permeate. The key aim in this RO-orientated method was to retain the silica in solution until after the RO concentration in order to avoid scaling and fouling of the system. However, once the silica concentration in the fluid reaches a certain threshold, it will be commercially viable to induce colloid formation and collect the colloidal silica for sale or use. If colloid formation is induced before this threshold, the fluid will be more dilute and the resultant extraction processes will be less economically viable, require greater throughput time and require greater throughput energy.

Known methods for the production of colloidal silica (e.g. via sodium silicate) are generally only economically viable where the initial concentration of the silica solution is from 2-5 m %. The present invention makes use of a novel source of silica colloids and takes the silica concentration from a comparatively low silica concentration to 2-5 m % in an economically viable manner. Further, ultrafiltration of colloidal silica at lower temperatures (i.e. 40-70° C.) reduces problems with scaling of species such as calcium carbonate and calcium sulphate because they are sufficiently soluble at these lower temperatures not to precipitate.

In order to efficiently extract silica from a silica concentrate, it is desirable to use the concentrate at a relatively high silica concentration, i.e. greater than 20 m %. The higher the concentration of silica in the concentrate, the more is able to be extracted. In addition, in an industrial context, it is possible that extraction of silica from the fluid will take place at a different location and different time to the energy extraction and silica concentration. In these situations it is desirable for a number of reasons (e.g. logistical and cost) to have a highly concentrated silica concentrate. Thus the invention provides a method of producing a colloidal silica concentrate with a colloidal silica concentration of at least 20 m %, 25 m %. 30 m %, 35 m %, 40 m %, 45 m % or 50 m %. Although higher concentrations may be theoretically achievable using the methods described herein, the viscosity of such compounds will be too high to yield a usable product. Although each geothermal source differs in its particular characteristics, in general terms, it is commercially desirable to obtain a fluid comprising colloidal silica at a concentration of at least 20 m %.

Previous attempts to extract silica from geothermal waters have foundered due to the difficulties of working with silica-containing fluids that have a propensity to form highly viscous silica gels. Other components of the geothermal fluid commonly cause uncontrolled fouling and scaling of infrastructure. The complexity of the mineral mix in such fluids also gives rise to unexpected chemical interactions and unpredictable precipitation characteristics. Overall, the difficulties encountered in dealing with such fluids mean that such ventures are expensive and high-risk. Despite initial setbacks and considerable process development time, the inventors have developed a process for the rapid and cost-effective production of a commercial grade colloidal silica concentrate from a geothermal fluid. This improved process enables geothermal fluid to become a viable silica colloid production source and provides a commercially viable alternative to known methods of colloidal silica production (for example the sodium silicate method described above).

Accordingly in one aspect the invention provides a method of producing a colloidal silica concentrate from a geothermal fluid containing silica, the method comprising:
a. reducing the temperature of the fluid to a temperature sufficient for colloidal nucleation to occur;
b. settling the fluid to allow colloidal silica to form;
c. passing the fluid through a first ultrafiltration unit comprising a spiral wound membrane to yield a first UF concentrate;
d. treating the first UF concentrate using one or more further ultrafiltration steps to yield a colloidal silica concentrate.

The method comprises the use of a first ultrafiltration unit comprising a spiral wound membrane. Spiral wound membranes are typically employed in methods for the purification of drinking water and other techniques where only a small amount of matter is being removed from the fluid. The inventors have found that using a spiral wound membrane for ultrafiltration significantly reduces the energy consumption of the ultrafiltration when compared to standard ultrafiltration membranes such as a tubular membrane. This in turn allows for the economic filtration of larger quantities of fluid. The spiral wound membrane also provides a surprisingly high resilience to fouling by colloidal silica. Without wishing to be bound by theory, it is believed that the colloidal silica particles are repelled by the surface of the membrane due to the high degree of negative charge built up on the surface of the colloids during the settling and curing process. This enables the permeate to pass through while the polar silica colloids are retained in the concentrate.

FIG. 1 shows a particular embodiment of the invention in which geothermal fluid 1 is dosed with sodium hydroxide 2 then passed to a heat exchanger 3. The cooled fluid is then passed to a settling tank 4 to allow colloidal silica to form. The fluid is then dosed with a dispersant 5 before being fed to a curing tank 6. The fluid is then filtered through a first ultrafiltration unit 7. The concentrate is dosed 8 with sodium hydroxide prior to being passed to an ultrafiltration feed tank 9. The permeate from the first ultrafiltration unit 7 is passed to a reverse osmosis unit 10. The permeate from the reverse osmosis unit 10 is passed to a diafiltration tank 11 for use in a second ultrafiltration unit 12. The concentrate from the reverse osmosis unit 10 is passed to waste 13. The fluid from the ultrafiltration feed tank 9 is combined 14 with the fluid from the diafiltration tank 11 and passed to a second ultrafiltration unit 12. The permeate from the second ultrafiltration unit is passed to waste 13 while the concentrate is passed to a product tank 15. A portion of the RO concentrate is recycled to the settling tank 4.

The geothermal fluid received and treated by the methods described herein may be any geothermal fluid. In particular embodiments, the fluid is separated geothermal water (SGW). Prior art processes generally limit themselves to consideration of extraction of silica from cooled geothermal waters downstream of a geothermal energy extraction system. For example WO2009/079047 states in paragraph [0040] that the geothermal fluid was obtained downstream from the power plant exchanger. Also Harper (1992) provides a flow diagram showing precipitation of silica from a source feed of 70-80° C. downstream of a binary cycle turbine. Preferably the geothermal fluids used by the processes of the present invention are from naturally pressurised sources such as from a flash plant (i.e. separated geothermal water). The autogenous pressure exerted by fluids at high temperatures has advantages in maintaining the pressure of the system required for silica concentration without requiring additional pumps and consequent energy use. Accordingly, the system comprises a naturally pressurised system without the use of pumps or other equipment which can be expensive and maintenance-intensive.

The method of the invention is believed to concentrate a silica component of geothermal fluid with any concentration of silica. However from a commercial perspective, it is desirable to use a source fluid with as high a silica concentration as possible in order to reduce the costs associated with concentration of the silica and colloid formation. Preferably, the concentration of silica in the geothermal fluid is at least 300 ppm. Preferably, the concentration of silica in the geothermal fluid is selected from at least 400 ppm, at least 500 ppm, at least 600 ppm, at least 700 ppm, at least 740 ppm at least 800 ppm, at least 1000 ppm and at least 1200 ppm.

Preferably the geothermal fluid is received from a reverse osmosis process to concentrate silica. Preferably the RO concentration process is substantially as described above with reference to New Zealand patent application no. NZ 625448 or WO2015/178783.

The method of the present invention achieves the formation of colloidal silica followed by ultrafiltration to concentrate the colloidal silica. The inventors have found that formation of colloidal silica is a pH-sensitive process and requires a pH of between 7.0 and 9.0. Preferably the pH of the geothermal fluid is adjusted prior to settling the fluid. If the pH of the fluid is too low, this prevents silica colloid formation and also leads to agglomeration of the colloids to form an intractable gel. If the pH is too high, the colloids simply dissolve to form monomeric silica in solution. Accordingly, the method comprises adjusting the pH of the geothermal fluid to be sufficiently high to facilitate colloidal silica production while being sufficiently low to avoid dissolution of the colloidal silica. Preferably the pH of the geothermal fluid is adjusted to a pH selected from the group consisting of between 7.0 and 8.0, between 7.0 and 8.5, between 7.5 and 9.0, between 8.0 and 9.0, greater than 7.0, greater than 7.5, greater than 8.0, greater than 8.5, approximately 7.0, approximately 7.5, approximately 8.0, approximately 8.5, approximately 9.0.

The pH may be adjusted by methods known to those of skill in the art. Preferably the pH of the geothermal fluid is increased by the addition of at least one alkali to the geothermal fluid. Preferably the alkali is sodium hydroxide. In alternative embodiments, the alkali is selected from the group consisting of potassium hydroxide, calcium hydroxide and magnesium hydroxide.

Methods of pH adjustment of the geothermal fluid will be known to those of skill in the art. However, by way of example, the pH is adjusted by a dosing means, preferably comprising a standard injection port. Preferably, the geothermal fluid is mixed immediately after the pH adjustment. Preferably, the geothermal fluid passes through a static mixer to effect the mixing post-pH adjustment. Similar dosing means and methods of dosing and mixing are applicable to the step of adjusting the pH of the first UF concentrate described below. Similar dosing means and methods of dosing and mixing are applicable to the step of adding a dispersant as described below.

Colloidal silica forms when the fluid becomes oversaturated with silica, also called nucleation. As the temperature decreases, the solubility of silica decreases and the nucleation point is reached. Given sufficient silica concentration, saturation is achieved and silica colloids start to form. The present invention comprises a step of reducing the temperature to a temperature between 30° C. and 80° C. which is appropriate for colloidal silica to form. Preferably the temperature is reduced by passing the fluid to one or more heat exchangers.

Preferably, the geothermal fluid is reduced from a temperature of between about 90° C. and about 250° C. Preferably the temperature of the geothermal fluid is selected from the group consisting of between about 90° C. and about 150° C., between about 100° C. and about 140° C., at least 90° C., at least 100° C., at least 110° C., at least 120° C., at least 130° C., at least 140° C., less than 150° C., less than 140° C., less than 250° C., less than 200° C., less than 185° C., less than 150° C., less than 130° C., less than 120° C., approximately 90° C., approximately 100° C., approximately 110° C., approximately 120° C., approximately 130° C., approximately 140° C., approximately 150° C., approximately 185° C., approximately 200° C. or approximately 250° C.

Further, the apparatus and methods described herein are particularly useful for geothermal fluids of greater than 125° C. due to the use of the spiral wound membrane, the diafiltration using reverse osmosis permeate and the two UF stages being used.

Preferably the temperature is reduced to between 30° C. and 80° C. Preferably the temperature reduced to is selected from the group consisting of between 30° C. and 80° C., between 30° C. and 70° C., between 30° C. and 60° C., between 40° C. and 70° C., between 40° C. and 80° C., at least 30° C., at least 40° C., at least 50° C., at least 60° C., less than 80° C., less than 70° C., less than 60° C., less than 50° C., approximately 35° C., approximately 40° C., approximately 45° C., approximately 50° C., approximately 55° C., approximately 60° C., approximately 65° C., approximately 70° C., approximately 75° C., approximately 80° C.

Any appropriate heat exchanger could be used for this purpose and those of skill in the art will appreciate such. Preferably, the heat exchanger is a plate heat exchanger, a pipe-type heat exchanger or a tube and shell heat exchanger. Those of skill in the art will also appreciate that a single or multiple heat exchangers may be used and such options are intended to fall within the scope of the term "heat exchanger".

The temperature differential between the incoming fluid and the pipework and instrumentation can cause internal flashing or a "water hammer effect" as pockets of the fluid vaporise. These effects can damage equipment including the heat exchanger and ultrafiltration units. In order to address these issues, the inventors found pressurising the system reduced the incidence of "water hammer". Preferably, the heat exchanger is under back pressure to prevent flashing of the geothermal fluid during cooling.

Following the temperature reduction, the fluid is settled for a period to allow the colloids to grow. Preferably the settling occurs in one or more settling tanks. Preferably, the size of the silica colloids formed is controlled by the settling time in the one or more settling tanks.

Preferably, the settling time is between 5 minutes and 2 hours. Preferably, the settling time is approximately 5 minutes, Preferably, the settling time is selected from the group consisting of greater than 5 minutes, greater than 10 minutes, greater than 15 minutes, greater than 30 minutes, greater than 1 hour, greater than 2 hours, less than 6 hours, less than 2 hours, less than 1 hour, less than 30 minutes, less than 15 minutes, between 10 minutes and 1 hour, between 10 minutes and 45 minutes, approximately 5 minutes, approximately 10 minutes, approximately 15 minutes, approximately 20 minutes, approximately 30 minutes, approximately 45 minutes, approximately 1 hour and approximately 2 hours.

The settling tank may be any form of vessel appropriate for colloids to grow. Apart from a standard cylindrical or cuboid shaped vessel, the tank may also be a tube, column or pipe. The flow of the settling tank may be substantially constant or may be intermittent. For example using a tube or column type settling tank, the flow may be constant and the settling time will be determined by the tube/column length and the flow rate.

In one embodiment, two or more settling tanks are linked in series with a set time for each tank, the settling time being calculated by the time in all the tanks.

The inventors have found that the temperature to which the fluid is reduced by the heat exchanger has an effect on the characteristics of the colloidal silica produced. As such, the invention further provides a method of controlling the mean particle size of silica colloids formed from a geothermal fluid containing silica, the method including:
  a. reducing the temperature of the fluid to a temperature sufficient for colloidal nucleation to occur;
  b. allowing colloids with a controlled dispersity to form by settling the fluid for a settling time at a settling temperature.

Preferably the colloid size comprises the mean number diameter of the silica colloids. Preferably, a dispersant is added after a growth period to substantially stop the colloid growth.

Example 2 demonstrates that the mean number diameter of colloidal silica particles is reduced where a lower temperature fluid is used for colloid formation. For example the inventors have determined that if fluid is reduced to a temperature of approximately 70° C., and is maintained at substantially this temperature during colloid formation, the colloid size is greater than the size of a colloid formed at substantially 40° C. (see table 1 and compare FIG. 3a (40° C.) with FIG. 3b (70° C.)).

One particular advantage of the present invention is the unexpected ability to form colloidal silica with a relatively uniform particle size distribution. This aspect of the invention is important because it is desirable for commercial grade silica to have a relatively uniform distribution, i.e. be monodisperse. Particle size is typically measured by dynamic light scattering (DLS), where the colloidal particle sizes are measured in situ by light scattering techniques. Coherent laser light is directed into the solution and the scattering of the light when detected, either by transmission or reflection, gives a measure of the particle size.

Preferably the method of producing a colloidal silica concentrate comprises a step of adding a dispersant to the geothermal fluid following colloidal silica formation and prior to being received at the first ultrafiltration unit. The inventors have found that the addition of a dispersant at this stage, in conjunction with controlling the temperature drop of the geothermal fluid via the heat exchanger, allows a particular colloid size and dispersity to be achieved and maintained. The dispersant is believed to substantially stop colloid formation thus arresting the increase in particle size dispersity that would otherwise occur. The dispersant also stabilises the colloids by inhibiting agglomeration to form gels which can foul equipment. Without wishing to be bound by theory, it is believed that the increased stability of the colloids is due to an increase in surface negative charge density which repels colloid particles from each other thus inhibiting agglomeration.

Dispersants will be known to those of skill in the art, however by way of example, the dispersant is selected from the group consisting of Nalco 980 and Accumer 5000. Preferably, the colloidal silica concentrate comprises a substantially monodisperse colloidal silica concentrate. Preferably, substantially monodisperse means that the standard deviation of the particle sizes of the colloidal silica is less than 50 nm. In some embodiments, the dispersity of the product is particularly important and the methods of the invention provide a substantially monodisperse product where the standard deviation of the particle sizes of the colloidal silica is less than 20 nm. The decreased standard deviation can be achieved by carefully maintaining the temperature during the settling and optionally the curing process. Preferably, the dispersant is added at a dosage of 5 ppm. Preferably, the dispersant added is between 1 and 10 ppm.

In a further aspect, the invention provides a method of controlling the dispersity of a colloidal silica concentrate prepared from a geothermal fluid containing silica, the method including:
  a. reducing the temperature of the fluid to a temperature sufficient for colloidal nucleation to occur;
  b. allowing colloids with a controlled dispersity to form by settling the fluid for a settling time at a settling temperature;
  c. filtering the fluid to yield a concentrate of from 2 m % to 10 m % using ultrafiltration with a spiral wound membrane.

Preferably the colloidal silica concentrate is substantially monodisperse. Preferably, substantially monodisperse means the substantially monodisperse concentrate comprises a standard deviation of range of particles sizes of the colloidal silica of less than 50 nm.

Preferably, a dispersant is added after the growth period to substantially stop the colloid growth. Preferably, the method further comprises curing the fluid for a period following colloid formation and prior to the fluid being received at the first ultrafiltration unit. Preferably, the curing is carried out in one or more curing tanks. Preferably, a dispersant is added to the fluid prior to entering the curing tank and the period is sufficient for colloidal growth to substantially stop.

Preferably, the curing period is sufficient to substantially stop colloid formation. Preferably the curing period is approximately 1.75 hours. Preferably the curing period is between 1 second and four hours. Preferably, the curing period is approximately 1 hour, approximately 2 hours, approximately 3 hours or approximately 4 hours.

Ultrafiltration is used to filter matter from a feed fluid in a range from 0.005-0.01 μm (>1000 Dalton). The inventors have found that an ultrafiltration unit comprising a spiral wound (SW) membrane is surprisingly energy efficient when employed in the context of the current invention to concentrate colloidal silica. Spiral wound membranes are typically used for water purification and to the inventors knowledge have not been employed for the concentration of colloids. This is due to the prevailing view in the art that such colloids would block the pores of the membrane and lead to uncontrollable fouling. Because of the tight clearances within the elements, if the colloids agglomerate they can block the spacers and membranes. Indeed spiral wound elements are more difficult to clean than tubular membranes. Although the UF system described herein could increase colloidal silica concentrations to as high as 20 m %, a preferable concentration is 2 m % which lessens the risk of colloid agglomeration and resultant fouling of the membranes, and lessens the frequency with which cleaning has to be carried out.

SW membranes are composed of a combination of flat membrane sheets separated by a thin meshed spacer material which serves as a porous plastic screen support. These sheets are rolled around a central perforated tube and fitted into a tubular pressure sealable UF housing. The feed solution passes over the membrane surface and the permeate spirals into the central collection tube.

UF membrane film is used to reject only colloidal material, so that water, dissolved salts and metals can easily pass through. This has the effect of dewatering the colloidal silica solution and hence bringing it up to higher concentrations when recirculated in a feed-and-bleed type manner.

The inventors have found that using SW membranes as opposed to the more common tubular membranes has a number of advantages:

- SW membranes approximately halve pump power consumption. This means that a fluid with relatively low silica concentration (i.e. approximately 500 ppm) can be processed in a commercially viable manner;
- Each membrane element holds large amounts of membrane area, therefore fewer UF units are required;
- The required feed flow rates for the elements are relatively low and hence the system requires smaller pumps, resulting in lower electrical pumping costs;
- Standard fibreglass RO/UF housings can be used to house the spiral wound UF elements. Fibreglass is highly corrosion resistant, which reduces the risk of chloride induced corrosion in the system.
- The membranes can be cleaned using relatively safe substances such as hydrochloric acid and sodium hydroxide.

Preferably, the SW membranes are cleaned less frequently than once every 7 days. Preferably they are cleaned less frequently than once every 14 days or 30 days.

Preferably the flow rate through a single 8 inch spiral wound membrane is between 0.5 l/s and 2 l/s. Preferably, the flow rate through this membrane is less than 2 l/s, less than 1 l/s, approximately 0.5 l/s, approximately 1 l/s, approximately 1.5 l/s or approximately 2 l/s.

Preferably the SW membranes are cleaned using a mild acid and optionally a mild alkali. Preferably the mild acid is 0.01M hydrochloric acid. Those of skill in the art will appreciate other acids and alkalis that could be used to periodically clean the membrane. Preferably the mild alkali is 0.01M sodium hydroxide.

The inventors have also found that pre-filtering the geothermal fluid prior to ultrafiltration removes particulate matter and reduces fouling and extends the lifetime of the SW membranes. Typically some precipitation of silica occurs in the settling and curing stages of the process and this pre-filter ensures that the precipitated silica does not pass to the UF unit or beyond. Preferably the geothermal fluid is pre-filtered prior to entering the ultrafiltration unit to remove particulate matter. Preferably, the pre-filter comprises a 100 um screen. Preferably the screen comprises a screen size selected from the group consisting of from 10 um to 200 um, approximately 10 um, approximately 20 um, approximately 50 um, approximately 100 um, approximately 150 um, and approximately 200 um.

Preferably, the first UF unit produces a first UF concentrate wherein the silica concentration is up to 20 m %. Preferably, the concentration is selected from the group consisting of greater than 0.1 m %, greater than 0.5 m %, greater than 1 m %, greater than 1.5 m %, greater than 2 m %, greater than 5 m %, greater than 10 m %, greater than 15 m %, between 0.1 m % and 20 m %, approximately 0.5 m %, approximately 1 m %, approximately 1.5 m % and approximately 2 m %, approximately 3 m %, approximately 4 m %, approximately 5 m %, approximately 10 m %, approximately 15 m %, and approximately 20 m %.

Preferably, the first UF unit produces a first UF concentrate wherein the silica concentration is selected from the group consisting of greater than 0.1 m %, greater than 0.5 m %, greater than 1 m %, greater than 1.5 m %, greater than 2 m %, greater than 5 m %, greater than 10 m %, greater than 15 m %, between 0.1 m % and 20 m %, approximately 0.5 m %, approximately 1 m %, approximately 1.5 m % and approximately 2 m %, approximately 3 m %, approximately 4 m %, approximately 5 m %, approximately 10 m %, approximately 15 m %, and approximately 20 m %.

The first, second or further UF unit may comprise more than one stage/physical UF housing. In particular embodiments, the UF unit comprises two or more stages connected in series in which the fluid is filtered and passed to the next stage at a higher concentration for further filtration/concentration. In this way, a stepwise increase in concentration is achieved without using excessive energy or pressure in each UF stag. Preferably, the UF unit comprises two or more stages. Preferably, each stage comprises multiple UF membranes in parallel where said stages are connected in series. Using two or more stages in each UF unit improves the overall efficiency of the process by enabling it to keep operating during cleaning of the ultrafiltration units. This is because each stage typically consists of multiple elements connected in parallel. A single element can be disconnected and cleaned or replaced independently of the other stages. This enables the continuous processing of the fluid without costly downtime incurred by stopping the entire unit.

In an embodiment, the first UF unit comprises a feed and bleed UF design. It will be appreciated by those of skill in the art that a UF unit operating using a feed and bleed design will require a feed/buffer tank. UF units of the invention (including the first and optionally a second or further UF unit) may include such a feed tank, the specification of which will be known to those of skill in the art. In another embodiment, the first UF unit comprises a mixed series and parallel feed design.

Preferably, the first ultrafiltration unit separates colloidal silica from the geothermal fluid. Preferably, the spiral wound membrane of the first UF unit has a molecular weight cutoff (MWCO) of between 1000 daltons and 7000 Daltons, preferably between 3000 and 5000 daltons. In alternative embodiments, the MWCO is greater than 1000 daltons, greater than 4000 daltons, approximately 1000 daltons, approximately 2000 daltons, approximately 4000 daltons, approximately 10000 daltons or greater than 10000 daltons.

Alternative membranes may be employed to retain particles of different sizes. Typically, the colloidal silica retained by the UF unit is greater than 5 nm, greater than 8 nm, with an average size of approximately 12 nm formed at 40° C.

Any remaining monomeric silica in the geothermal fluid passes through the first UF unit membranes to form a first UF permeate. To increase the overall silica recovery for the plant, the method may further comprise the step of passing the first UF permeate to a reverse osmosis (RO) unit. The RO unit captures the monomeric silica in the RO concentrate which is then recycled for silica colloid formation and subsequent processing.

Preferably the first UF concentrate exits the first UF unit at a silica concentration of approximately 2 m % and approximately pH7.0-9.0. At this concentration and pH, the colloids have a tendency to agglomerate which results in gelling of the colloids to form silica gel. Accordingly, the method includes a step of adjusting the pH of the first UF concentrate to between 9.0 and 11.0. This higher pH reduces gelling while still maintaining colloid stability.

Preferably, the pH of the first UF concentrate is adjusted to between 9.0 and 11.0. Preferably the pH of the geothermal fluid is adjusted to a pH selected from the group consisting of between 9.0 and 10.5, between 9.0 and 10.0, between 9.5 and 11.0, between 9.5 and 10.5, greater than 9.0, greater than 9.5, greater than 10.0, less than 11.0, less than 10.5, approximately 9.0, approximately 9.5, approximately 10.0, approximately 10.5, and approximately 11.0.

As noted above, the inventors have found that the spiral wound membrane is particularly efficient at producing a colloidal silica concentrate at up to 20 m %. For commercial purposes, it is desirable to produce a concentrate at greater than 20 m % and preferably 30 m % to ensure logistical efficiencies can be realised for transport and use of the colloidal silica product. In coarser colloids of greater than 25 nm concentrations it can be desirable to have concentrates of up to 50 m %). Accordingly, the invention provides a method of production of a colloidal silica concentrate comprising the step of treating the first UF concentrate using one or more further ultrafiltration steps to yield a colloidal silica concentrate at a concentration of at least 10 m % and preferably 20 m %. In one embodiment, the one or more further ultrafiltration steps comprises ultrafiltration using a tubular membrane or a spiral wound membrane in a second ultrafiltration unit. The inventors have found that tubular membranes are effective for these higher level concentration steps due to their advantageous clearance characteristics. In one embodiment, the second UF unit comprises a spiral wound membrane. It is preferable to use only one further UF unit in order to minimise capital expenditure on equipment.

Accordingly, in one embodiment, the invention provides a method of producing a colloidal silica concentrate from a geothermal fluid containing silica, the method comprising:
  a. reducing the temperature of the fluid to a temperature sufficient for colloidal nucleation to occur;
  b. settling the fluid to allow colloidal silica to form;
  c. passing the fluid through a first ultrafiltration unit comprising a spiral wound membrane to yield a first UF concentrate of between 0.1 m % and 20 m % silica;
  d. treating the first UF concentrate using a second ultrafiltration step to yield a colloidal silica concentrate of greater than 20 m % silica.

Preferably, the membrane of the second UF unit retains particles of greater than approximately 5 nm or greater than approximately 200000 daltons. Preferably, the colloidal silica retained by the second UF unit is greater than 8 nm, or has an average size of approximately 12 nm.

Preferably, the second or further UF unit comprises a feed and bleed UF design.

Preferably, the second or further UF unit comprises two or more stages.

Preferably the last stage of the second or further UF is batch.

Preferably, the second or further UF unit produces a UF concentrate wherein the silica concentration is selected from the group consisting of greater than 2 m %, greater than 5 m %, greater than 10 m %, greater than 15 m %, greater than 20 m %, greater than 30 m %, greater than 40 m %, between 2 m % and 50 m %, approximately 10 m %, approximately 20 m %, approximately 30 m %, approximately 40 m % and approximately 50 m %.

The second or further UF unit may comprise more than one stage/physical UF housing. Suitable designs for the second UF unit will be known to those of skill in the art. However, by way of example, the system may comprise a single multi-stage train that is designed to operate continuously as a feed-and-bleed type system. It will be appreciated by those of skill in the art that a UF unit operating using a feed and bleed design will require a feed/buffer tank. UF units of the invention (including the first and optionally a second or further UF unit) may include such a feed tank, the specification of which will be known to those of skill in the art. In another embodiment, the UF unit comprises a mixed series and parallel feed design. Preferably the process is operated as a batch process. This is preferable as it enables each batch to be individually traceable and easily identifiable if any issues are identified with a particular batch. When using geothermal fluid, this is particularly important due to the natural variability of the geothermal fluid as it is concentrated.

Accordingly, in one embodiment, the invention provides a method of producing a colloidal silica concentrate from a geothermal fluid containing silica, the method comprising:
  a. reducing the temperature of the fluid to a temperature sufficient for colloidal nucleation to occur;
  b. settling the fluid to allow colloidal silica to form;
  c. passing the fluid through a first ultrafiltration unit comprising a spiral wound membrane to yield a first UF concentrate of between 0.1 m % and 20 m % silica;
  d. treating the first UF concentrate using a second ultrafiltration step to yield a colloidal silica concentrate of greater than 20 m % silica,
wherein the second ultrafiltration unit is operated as a batch process.

Following production of a colloidal silica concentrate, the concentrate may be stored or transported according to known methods and using known equipment.

As well as concentrating colloidal silica, the first or further UF steps results in dewatering of the fluid and subsequent concentration of other less desirable components of the geothermal fluid such as salts or impurities. Also, the concentrate at relatively high colloidal silica concentration is prone to gelling as a result of interactions with such salts or impurities. To address this issue, the inventors contemplate a diafiltration system operating to reduce salt and impurity concentrations from the colloidal silica concentrate at the second or further UF step. The inclusion of such salts and impurities in the colloidal silica matrix is undesirable therefore employing this step enables the production of a colloid of higher value. Diafiltration also reduces the risk of formation of silica gels in the apparatus and on the membranes. Preferably the first UF unit concentrates the silica to between 2 and 10 m %, then the first silica concentrate is subjected to diafiltration to reduce the total dissolved salt concentration to less than 1000 ppm. This step also reduces the concentration of toxic components such as arsenic. The use of RO permeate for diafiltration purposes is particularly desirable when using geothermal fluid due to the inherent variability in the composition of the fluid. The inventors have found that this variability can be reduced by employing such methods.

The diafiltration solvent fed to the second or further UF units is preferably supplied from a permeate generated by reverse osmosis processing of a permeate from the first UF unit. Although any other solvent source may be used as the diafiltration solvent, reusing the first UF permeate in this way has particular benefits when used in environments where water is scarce or expensive. Accordingly the inclusion of an RO unit provides a dual purpose and effectively integrates the UF, diafiltration and RO steps to provide an important improvement over known methods. The RO step captures the monomeric silica in the RO concentrate which is then recycled for silica colloid formation and subsequent processing. This RO step also provides a source of potable water for use in cleaning of the system, and diafiltration to reduce potentially harmful salt and impurity build-up. It has surprisingly been found that the methods of the invention as described herein provide a colloidal silica concentrate with a particularly low Aluminium concentration.

Accordingly, in a particular embodiment, the first UF unit produces a first UF permeate which is passed through a reverse osmosis (RO) unit to yield an RO permeate and an RO concentrate. Reverse osmosis units function by way of a pressurised fluid being introduced to a membrane. A portion of the components of the fluid that are smaller than the pore size of the membrane will be forced through by a pressure differential across the membrane thus creating a permeate. The retained components form a concentrate.

Accordingly, in one embodiment, the invention provides a method of producing a colloidal silica concentrate from a geothermal fluid containing silica, the method comprising:
a. reducing the temperature of the fluid to a temperature sufficient for colloidal nucleation to occur;
b. settling the fluid to allow colloidal silica to form;
c. passing the fluid through a first ultrafiltration unit comprising a spiral wound membrane to yield a first UF permeate, and a first UF concentrate of between 0.1 m % and 20 m % silica;
d. passing the first UF permeate to a reverse osmosis (RO) unit to yield an RO permeate and an RO concentrate;
e. treating the first UF concentrate using a second or further ultrafiltration step to yield a colloidal silica concentrate of greater than 20 m % silica,
wherein the second ultrafiltration unit is operated as a batch process, and wherein at least a portion of the RO permeate is used for diafiltration in the second or further ultrafiltration unit.

The permeate obtained from the reverse osmosis step comprises mainly water. As such, the invention further provides a method of production of water from a geothermal fluid. Preferably the water is substantially pure water. Water produced by the methods described herein may be used for any appropriate use. However, by way of example, it may be used for domestic heating, power generation, irrigation, or as a potable water source.

Preferably, the recovery rate of the RO unit is between 50% and 80%. Preferably the recovery rate is approximately 50%, approximately 60%, approximately 70% or approximately 80%. Since the concentration of dissolved monomeric silica is relatively low in the first UF permeate, the RO unit can be run at a relatively high recovery rate.

Preferably, the RO permeate is passed to a diafiltration tank. Preferably, at least a portion of the RO permeate is used to set up a diafiltration process in the second or further ultrafiltration unit. Preferably the at least a portion of the RO permeate is received in a UF feed tank which feeds the second or further ultrafiltration step.

Preferably, the first UF concentrate is combined with the fluid from the diafiltration tank and passed to the second ultrafiltration unit.

Preferably the RO concentrate is recycled to the settling tanks. This ensures that dissolved monomeric silica is recycled for colloid formation and collection. The re-introduction into the settling tanks provides for the growth of more colloids and therefor a greater yield from the same source.

REFERENCES

Harper et al. 1992—Towards the efficient utilization of geothermal resources. Geothermics 21, pp 641-651; Harper, 1997—U.S. Pat. No. 5,595,717A—Controlled precipitation of amorphous silica from geothermal fluids or other aqueous media containing silicic acid.

EXAMPLES

Example 1—Polymerisation at Nucleation Temperature

The polymerisation characteristics of a sample of geothermal fluid with predominantly dissolved monomeric silica was tested to determine colloid formation.

Materials and Methods

A sample of geothermal fluid from Wairakei (New Zealand) was taken and the monomeric silica concentration adjusted to approximately 740 ppm. The pH of the fluid was adjusted to approximately pH8.5 by addition of sodium hydroxide. The temperature of the fluid was maintained at approximately 40° C. by insulation of the sample in a thermos flask. The polymerisation characteristics of the sample were measured periodically using the molybdite method for molybdate reactive silica.

Results and Analysis

Figure 2:
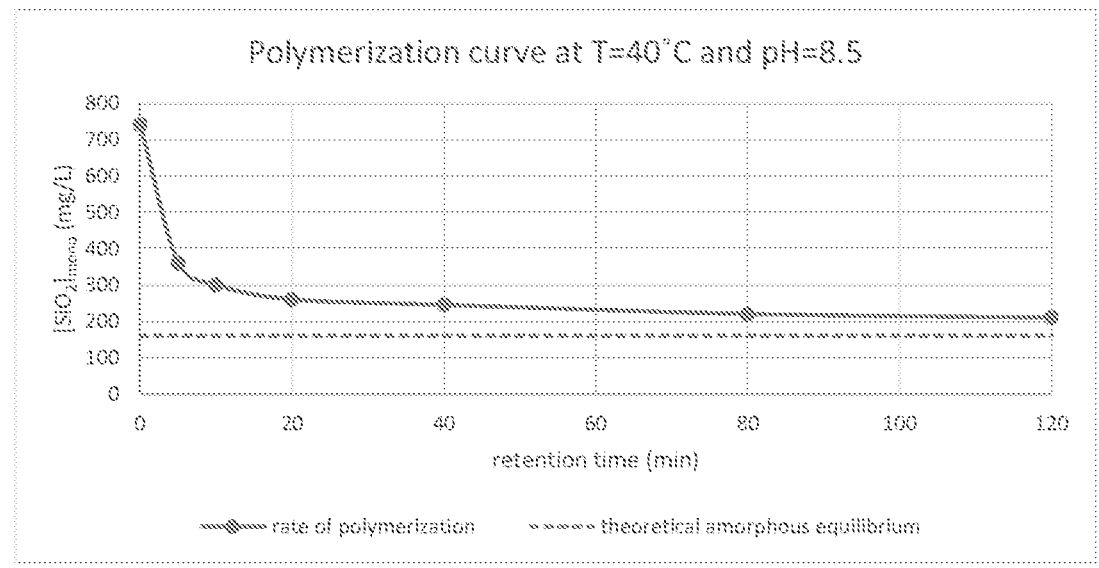
FIG. 2 shows the change of monomeric silica in a solution as colloidal silica is produced at 40° C. and pH8.5.

FIG. 2 shows the polymerisation curve at 40° C. and pH8.5. It can be seen that the greatest drop in monomeric silica concentration is within the first 20 minutes of the reaction. This indicates that the majority of colloidal silica will be formed during this time.

Example 2—Control of Colloid Size and Dispersity

Materials and Methods

Samples of geothermal fluid were taken from the first UF concentrate at approximately 10 m % colloidal silica. Sample C was formed using fluid reduced to 40° C. and sample F was formed using fluid reduced to 70° C.

The mean number diameter (MN) was measured using dynamic light scattering (DLS). The calculated specific surface area (CS) and the standard deviation of the particle size (SD) were calculated. MN is the average particle size is weighted towards the number distribution. Therefore this average can be skewed by many small particles to drive the average size downward. This type of average is related to the population.

SA provides an indication of the specific surface area. This computation assumes smooth, solid, spherical particles.

SD is a function of the width of the measured particle size distribution. A larger standard deviation suggests a greater spread in the size range of particles.

Results

TABLE 1

| Name | Description | MN (nm) | CS | SD |
|---|---|---|---|---|
| C | ~9 wt % when nucleation temp = 40° C. | 22.29 | 210.20 | 16.23 |
| F | ~10 wt % when nucleation temp = 70° C. | 58.30 | 77.37 | 44.00 |

Figure 3A:
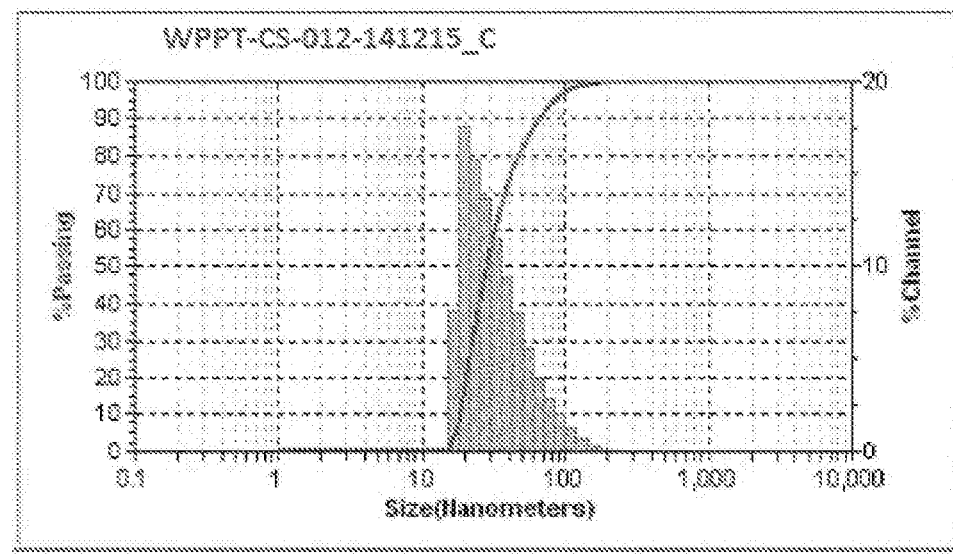
FIGS. 3a and 3b show silica colloid size and size distribution (dispersity).
Figure 3B:
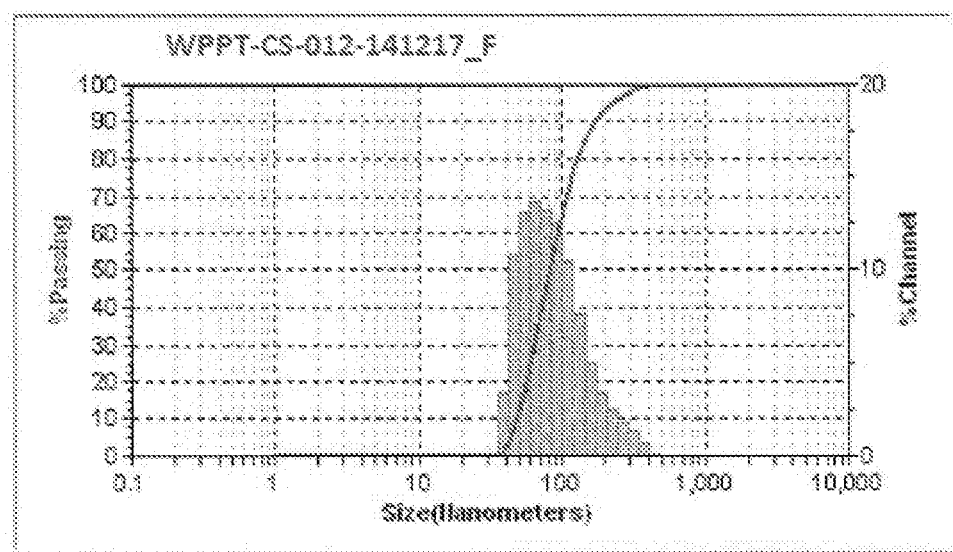

FIGS. 3a and 3b show silica colloid size and size distribution (dispersity). At higher temperature, it can be seen the average size of colloid increases.

The colloids can also be deemed bigger at the warmer nucleation temperature by comparing the specific surface area. This was 77 at the 70° C. nucleation temp and 210 at the 40° C. nucleation temp. Smaller colloids have a greater specific surface area due to their high area to volume ratio.

Conclusion

Example 2 demonstrates that the mean number diameter of colloidal silica particles is reduced where a lower temperature fluid is used for colloid formation. Accordingly, the invention provides a method of controlling the colloid particle size by adjusting the temperature at which the colloids form.

The higher temperature produced bigger colloids (FIG. 3b and table 1) because it had a lower silica saturation index (SSI). This meant that the oversaturation was not strong enough to form new nuclei, but rather preferentially attach to existing colloids. The higher temperature also has a more symmetric/monodisperse distribution as the system was able to maintain its temperature better when fed a hotter fluid.

Example 3—Production of a Colloidal Silica Concentrate

Materials and Methods

Separated geothermal water (SGW) was introduced into a system as shown in FIG. 1. The fluid was received at a series of plate heat exchangers which reduced the temperature from 126° C. to either 40° C. or 70° C. Caustic soda is also dosed prior to the heat exchangers to increase the pH to 8.5, which increases the rate of silica polymerisation. The fluid was then passed to five settling tanks with the fluid being retained in each one for seven minutes giving a total settling time of 35 minutes. This residence time allowed time for the colloids to form. The fluid is then dosed with a dispersant prior to entering the curing tank. The curing tanks will have a residence time of approximately two hours. The purpose of the dispersant is to charge the outer shell of the silica colloids with a negative charge which will cause individual silica particles to repel each other, thus resulting in a highly stable suspension. This prevents colloids agglomerating/growing during the ultrafiltration stage. By lowering the pH value, stability decreases: the particles react with each other and may form a gel. The gelling rate between pH 4 and 7 is very high.

A spiral wound UF membrane (4" membrane developed and manufactured by Membrane Development Specialists, San Diego, USA) was employed in the first UF unit consisting of three duplicate UF modules in parallel that were run simultaneously, with a further smaller module placed in series to increase the silica concentration up to 2 m %. Each of the modules is designed with three UF stages to progressively concentrate the colloidal silica as it is passed through. The system operated continuously using a feed-and-bleed design. The design parameters are listed below in Table 2. The molecular weight cutoff (MWCO) of the membrane was 4000 daltons.

TABLE 2

| UF1 design parameters | |
| --- | --- |
| Design Condition | Value |
| Number of vessels per module | 36 |
| Number of elements per vessel | 6 |

TABLE 2-continued

| UF1 design parameters | |
| --- | --- |
| Design Condition | Value |
| Feed temperature | 40-50° C. |
| Total concentration in | 0.10-0.12 m % |
| Silica concentration out (colloidal) | 2 m % |

Because the UF1 membranes are only tight enough to retain the silica colloids, the remaining monomeric silica in the feed fluid passes through the membranes into the UF1 permeate. To increase the overall silica recovery for the plant, approximately 70% of the UF1 permeate was then fed into a reverse osmosis unit where the monomeric silica concentrate is recycled and passed to the settling tank. The remaining 30% of the UF1 permeate was diverted to waste.

The 2 m % colloidal silica solution that exits UF1 was fed to a further ultrafiltration system (UF2) to perform a final concentration step from 2 m % up to the final product concentration of 30 m %. Prior to concentration in UF2 the UF1 concentrate was dosed with caustic soda to increase the pH from approximately 8.5 to approximately 10.0 which reduces the risk of gelling at high silica concentrations.

The Ultrafiltration 2 (UF2) system consisted of a single train that is designed to operate continuously as a feed-and-bleed type system. The train consisted of three stages in series, which progressively concentrate the colloidal silica up to the final concentration. The system uses PCI tubular UF modules for the entire UF2 system.

A reverse Osmosis unit processed approximately 70% of the UF1 permeate to 1) increase recovery of Si by recycling the monomeric silica being discharged in the UF1 permeate and 2) produce purified water to reduce the amount of water required for diafiltration between the UF1 and UF2 stages.

The overall RO recovery for this system was approximately 50%.

The UF2 system included diafiltration to flush out the salts and impurities from the colloidal silica product and reduce salt concentrations. Diafiltration reduces the formation of silica gels in UF2. The diafiltration water to each of the UF2 stages is supplied from the permeate from the reverse osmosis unit.

TABLE 2

| UF2 design parameters | |
| --- | --- |
| Design Condition | Value |
| Feed Flow | 5.81 L/s |
| Number of Stages | 3 operating + 1 standby |
| Number of vessels per stage | 60 |

Results

The method described resulted in growth of colloidal silica, and provided a concentration of silica at key stages as follows:

First UF concentrate=2 m %

Second UF concentrate 25-31 m %

The process was run continuously for 2 weeks and no significant fouling or blockages occurred.

The final concentrate was analysed and contained the following components (all amounts given in mg/l):

TABLE 3

Solid content analysis.

| Component | RO FEED | 30% Conc |
|---|---|---|
| Aluminium | 0.81 | 200 |
| Boron | 26 | 250 |
| Calcium | 17.4 | 1200 |
| Lithium | 10.8 | 9 |
| Magnesium | 0.01 | 30 |
| Manganese | <0.007 | 3 |
| Potassium | 160 | 700 |
| Silica (as SiO2) | 552 | 282000 |
| Sodium | 1080 | 2100 |

CONCLUSION

The inventors have demonstrated that a colloidal silica concentrate can be efficiently produced using a series of steps including ultrafiltration steps. Taking a geothermal fluid at high source temperature and silica concentration and obtaining a stable colloidal silica concentrate represents a major advance in the field. It is a breakthrough in being able to collect the silica component of a geothermal fluid using an energy efficient and economically viable process.

The invention claimed is:

1. A method of producing a colloidal silica concentrate from a geothermal fluid containing silica, the method comprising:
   a. reducing the temperature of the fluid to a temperature sufficient for colloidal nucleation to occur;
   b. settling the fluid to allow colloidal silica to form;
   c. adding a dispersant to the settled fluid;
   d. passing the fluid containing the colloidal silica through a first ultrafiltration (UF) unit comprising a spiral wound membrane to yield a first UF colloidal silica concentrate including between 0.1 mass % and 20 mass % silica;
   e. treating the first UF concentrate using one or more further ultrafiltration steps to yield a further UF colloidal silica concentrate including greater than 20 mass % silica; and
   wherein the colloidal silica concentrate is substantially monodisperse and wherein the substantially monodisperse concentrate comprises a standard deviation of range of particles sizes of the colloidal silica of less than 50 nm.

2. A method as claimed in claim 1 wherein the method further comprises curing the fluid for a period following colloid nucleation and prior to the fluid being received at the first ultrafiltration unit.

3. A method as claimed in claim 1, wherein the method further comprises adjusting the pH of the geothermal fluid to between 7.0 and 9.0 prior to ultrafiltration.

4. A method as claimed in claim 1 wherein the concentration of silica in the geothermal fluid containing silica is at least 300 ppm.

5. A method as claimed in claim 1 wherein the geothermal fluid is reduced from a temperature of between about 90° C. and about 250° C.

6. A method as claimed in claim 1 wherein the temperature is reduced to a temperature of between 20° C. and 80° C.

7. A method as claimed in claim 1 wherein the settling time is at least 5 minutes.

8. A method as claimed in claim 1 wherein the spiral wound membrane of the first UF unit has a molecular weight cutoff (MWCO) of between 1000 daltons and 7000 daltons.

9. A method as claimed claim 1 wherein the colloidal silica retained by the first UF unit has an average size of from 5 nm to 100 nm.

10. A method as claimed in claim 1 wherein the first UF unit comprises two or more stages wherein each stage comprises multiple UF membranes in parallel where said stages are connected in series.

11. A method as claimed in claim 1 wherein the first UF unit produces a first UF concentrate wherein the silica concentration is between 1 mass % and 20 mass % silica.

12. A method as claimed in claim 1 wherein the first UF concentrate is adjusted to a pH of between 9.0 and 11.0.

13. A method as claimed in claim 1 wherein the one or more further ultrafiltration steps comprises ultrafiltration through a second ultrafiltration unit wherein the membrane of the second UF unit retains particles of greater than approximately 200000 daltons.

14. A method as claimed in claim 1 wherein the one or more further ultrafiltration steps comprises ultrafiltration through a second ultrafiltration unit wherein the membrane of the second UF unit retains particles of greater than approximately 200000 daltons and produces a UF concentrate of greater than 20 mass %.

15. A method as claimed in claim 1 wherein the first UF unit produces a first UF permeate which is passed to a reverse osmosis (RO) unit to yield an RO permeate and an RO concentrate.

16. A method as claimed in claim 1 wherein the one or more further ultrafiltration steps comprises ultrafiltration through a second ultrafiltration unit,
   wherein diafiltration is carried out in the second ultrafiltration unit,
   wherein the first UF unit produces a first UF permeate which is passed to a reverse osmosis (RO) unit to yield an RO permeate and an RO concentrate and at least a portion of the RO permeate is used to carry out the diafiltration in the second ultrafiltration unit.

17. A method as claimed in claim 16 wherein the diafiltration reduces the total dissolved salt concentration to less than approximately 1500 ppm.

18. A method as claimed in claim 1 wherein the geothermal fluid contains silica at greater than 400 ppm, the pH of the geothermal fluid is adjusted to between 7.5 and 8.5; the temperature of the geothermal fluid is reduced from between 100° C. and 130° C. to between 35° C. and 75° C.; the fluid is settled for at least 5 minutes; and the pH of the first UF concentrate is adjusted to between 9.0 and 11.0.

* * * * *